US012673566B2

(12) United States Patent (10) Patent No.: US 12,673,566 B2
Miller et al. (45) Date of Patent: Jul. 7, 2026

(54) CHARGING CONNECTOR

(71) Applicant: GM GLOBAL TECHNOLOGY OPERATIONS LLC, Detroit, MI (US)

(72) Inventors: Samantha Gunter Miller, Berkley, MI (US); Douglas S. Cesiel, Farmington, MI (US); Aniket P. Kothari, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 938 days.

(21) Appl. No.: 17/903,561

(22) Filed: Sep. 6, 2022

(65) Prior Publication Data

US 2024/0075826 A1 Mar. 7, 2024

(51) Int. Cl.
*H02J 7/00* (2026.01)
*B60L 53/16* (2019.01)
*B60L 58/19* (2019.01)
*H02J 7/14* (2006.01)

(52) U.S. Cl.
CPC .............. *B60L 53/16* (2019.02); *B60L 58/19* (2019.02); *B60L 2210/30* (2013.01)

(58) Field of Classification Search
CPC .......... B60L 53/16; B60L 53/18; B60L 53/20; B60L 2210/30; B60L 55/00
USPC ........................................................ 320/132
See application file for complete search history.

(56) References Cited

U.S. PATENT DOCUMENTS

| | | | | |
|---|---|---|---|---|
| 2011/0029144 A1* | 2/2011 | Muller | .................. | B60L 53/305 |
| | | | | 700/298 |
| 2011/0216452 A1* | 9/2011 | Haines | ...................... | H02H 3/16 |
| | | | | 361/42 |
| 2014/0217813 A1* | 8/2014 | Kinomura | ............... | B60L 1/006 |
| | | | | 307/10.1 |
| 2015/0097526 A1* | 4/2015 | DeDona | .................... | B60L 3/00 |
| | | | | 320/109 |
| 2016/0144728 A1* | 5/2016 | Harper | .................... | B60L 53/67 |
| | | | | 320/109 |
| 2016/0268820 A1* | 9/2016 | Ono | ......................... | B60L 53/14 |
| 2016/0325635 A1* | 11/2016 | Masuda | .................. | B60L 53/66 |
| 2017/0057358 A1* | 3/2017 | Nakagawa | ............... | B60L 3/04 |
| 2020/0189408 A1* | 6/2020 | Ko | .......................... | B60L 53/16 |
| 2020/0304026 A1* | 9/2020 | Mu | ......................... | H02M 1/10 |
| 2021/0245610 A1* | 8/2021 | Ando | ..................... | B60L 53/305 |
| 2021/0252990 A1* | 8/2021 | Wang | ..................... | B60L 53/22 |
| 2021/0376524 A1* | 12/2021 | Ueki | ..................... | H01R 13/703 |
| 2022/0161676 A1 | 5/2022 | Marlow et al. | | |
| 2022/0185137 A1* | 6/2022 | Cesiel | ................. | H02J 7/00045 |

(Continued)

*Primary Examiner* — Alexis B Pacheco
(74) *Attorney, Agent, or Firm* — Quinn IP Law

(57) ABSTRACT

The concepts described herein provide a system and associated charging connector that is capable of offloading electric power stored in a rechargeable energy storage system (RESS) of an electrified vehicle to supply electric power to a stationary system, e.g., a residential dwelling or a business site, upon occurrence of a power outage in an electric power grid that supplies electric power to the stationary system. This includes the charging connector being capable of offloading electric power under conditions in which the RESS of the electrified vehicle is initially disconnected from the charging connector when the power outage occurs. This concept enables an electrified vehicle to supply electric power to a stationary system when connecting after a delay period subsequent to the power outage.

20 Claims, 2 Drawing Sheets

(56)　　　　　　　References Cited

U.S. PATENT DOCUMENTS

| 2022/0194236 | A1* | 6/2022 | Whiting | B60L 53/64 |
|---|---|---|---|---|
| 2023/0094716 | A1* | 3/2023 | Zenner | B60L 1/006 |
| | | | | 320/109 |
| 2023/0182614 | A1* | 6/2023 | Mo | H02J 7/0068 |
| | | | | 320/137 |
| 2023/0249565 | A1* | 8/2023 | Uno | B60L 53/14 |
| | | | | 701/22 |
| 2025/0112475 | A1* | 4/2025 | Malik | B60L 53/60 |

* cited by examiner

CHARGING CONNECTOR

INTRODUCTION

An offboard electric vehicle supply equipment (EVSE) charging station may be arranged to channel AC electric power from an electric power grid to a rechargeable energy storage system (RESS) of an electrified vehicle to effect charging of electrochemical battery cells therein. An EVSE charging station may be equipped with a charging connector, which is connectable to a charge port that is arranged at an accessible location on a body of an electrified vehicle. Charging terminals of the charge port are configured to receive and engage with mating charging pins of the charging connector of the EVSE charging station.

Under certain conditions, stationary charging systems may be capable of offloading electric power stored in a RESS of an electrified vehicle to supply electric power to a stationary system upon occurrence of a power outage in an electric power grid. Under certain conditions, an electrified vehicle may not be initially connected to a stationary system upon occurrence of a power outage in an electric power grid.

SUMMARY

The concepts described herein provide a charging connector system, apparatus, and method that are capable of offloading electric power stored in a rechargeable energy storage system (RESS) of an electrified vehicle to supply electric power to a stationary system, e.g., a residential dwelling or a business site, upon occurrence of a power outage in an electric power grid that supplies electric power to the stationary system. This includes the charging connector being capable of offloading electric power under conditions in which the RESS of the electrified vehicle is initially disconnected from the charging connector when the power outage occurs.

An aspect of the disclosure includes a charging connector for an electrified vehicle charging station. The charging connector is a multi-pin connector having a pilot voltage terminal, a proximity voltage terminal, and a connector controller. A first circuit has a first controllable switch, wherein the first circuit is electrically connected between a stationary battery and the pilot voltage terminal, and a second circuit has a second controllable switch that is controllable to electrically connect the stationary battery to a power link between the connector controller and a stationary inverter. The first switch is controllable to a closed state and the second switch is controlled to an open state when the charging connector is disconnected from a vehicle, and the first switch is controlled to an open state and the second switch is controlled to a closed state when the charging connector is connected to the vehicle.

Another aspect of the disclosure may include the first circuit with the first controllable switch being arranged in series with a diode and a resistive element between the stationary battery and the pilot voltage terminal.

Another aspect of the disclosure may include the charging connector having a positive DC power terminal, a negative DC power terminal, and a ground terminal.

Another aspect of the disclosure may include the charging connector being connected to a stationary power source via an electrical cable.

Another aspect of the disclosure may include the positive DC power terminal and the negative DC power terminal of the charging connector being connected to a bi-directional AC/DC power inverter via electrical cables.

Another aspect of the disclosure may include the stationary battery being a low voltage DC battery that powers the connector controller when the second switch is controlled to the closed state.

Another aspect of the disclosure may include the first switch being cyclically controllable to the closed state and an open state when the charging connector is disconnected from the charge port of the electrified vehicle.

Another aspect of the disclosure may include the charging connector being mated to and connectable to the charge port of the electrified vehicle.

Another aspect of the disclosure may include a system for supplying electric power to an electrical power distribution panel having an electrified vehicle charging station including a charging connector; a bi-directional AC/DC power inverter; a low-voltage battery. The charging connector is couplable, via a charge port, to a rechargeable energy storage system of an electrified vehicle. The charging connector includes a pilot voltage terminal, a proximity voltage terminal, and a connector controller; a first circuit including a first controllable switch, wherein the first circuit is electrically connected between a stationary battery and the pilot voltage terminal; and a second circuit including a second controllable switch that is controllable to electrically connect the stationary battery to a power link between the connector controller and a stationary inverter. The first switch is controllable to a closed state and the second switch is controlled to an open state when the charging connector is disconnected from a charge port of the electrified vehicle, and the first switch is controlled to an open state and the second switch is controlled to a closed state when the charging connector is connected to the charge port of the electrified vehicle. The electrified vehicle supplies electric power to the electrical power distribution panel upon the charging connector being connected to the charge port of the electrified vehicle.

Another aspect of the disclosure may include the charging connector being electrically connected to the electrical power distribution panel via the bi-directional AC/DC power inverter.

Another aspect of the disclosure may include the electrical power distribution panel being disposed at a fixed structure.

Another aspect of the disclosure may include the electrical power distribution panel being electrically connectable to an electric power system; and the electrical power distribution panel being arranged to transfer electric power from the electric power system to the electrified vehicle charging station via the bi-directional AC/DC power inverter. When a power interruption occurs between the electric power system and the electrical power distribution panel and the charging connector is disconnected from the charge port of the electrified vehicle, the first switch is controllable to the closed state and the second switch is controlled to the open state.

Another aspect of the disclosure may include the first switch being repetitively cyclically controlled to one of the closed state and an open state when the charging connector is disconnected from the charge port of the electrified vehicle.

Another aspect of the disclosure may include, when the power interruption occurs between the electric power system and the electrical power distribution panel, and the charging connector is connected to the charge port of the electrified vehicle subsequent to initiation of the power interruption, the first switch being controlled to the open state and the second switch being controlled to the closed state; wherein the electrified vehicle supplies electric power to the electrical power distribution panel upon the charging connector being connected to the charge port of the electrified vehicle.

Another aspect of the disclosure may include the first circuit including the first controllable switch being arranged in series with a diode and a resistive element between the stationary battery and the pilot voltage terminal.

Another aspect of the disclosure may include the charging connector having a positive DC power terminal, a negative DC power terminal, and a ground terminal.

Another aspect of the disclosure may include the positive DC power terminal and the negative power terminal of the charging connector being connected to the bi-directional AC/DC power inverter via electrical cables.

Another aspect of the disclosure may include the stationary battery being a low voltage DC battery that powers the connector controller when the second switch is controlled to the closed state.

Another aspect of the disclosure may include the charging connector being mated to and connectable to the charge port of the electrified vehicle.

Another aspect of the disclosure may include a method for supplying electric power to an electrical power distribution panel subsequent to a power interruption from an electric power source that is arranged to supply electric power thereto. The method includes connecting a charging connector of an electrified vehicle charging station to a charge port that is electrically connected to a rechargeable energy storage system (RESS) of an electrified vehicle, wherein the charging connector is electrically connected to a bi-directional AC/DC power inverter that is electrically connected to the electrical power distribution panel. Aspects of the method may include detecting, in a pilot voltage terminal of the charging connector, a non-zero voltage; activating a charge controller of the rechargeable energy storage system; sending, via the charge controller, a proximity signal to the charging connector; detecting, via a connector controller of the charging connector, the proximity signal; connecting, via the charging connector, a stationary DC battery; commanding, via the connector controller of the charging connector, a pilot signal to the charge controller; and controlling, via one of the charge controller and the connector controller of the charging connector, the electric power flow from the RESS to the electrical power distribution panel.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations of the elements and features presented above and below.

Figure 1:
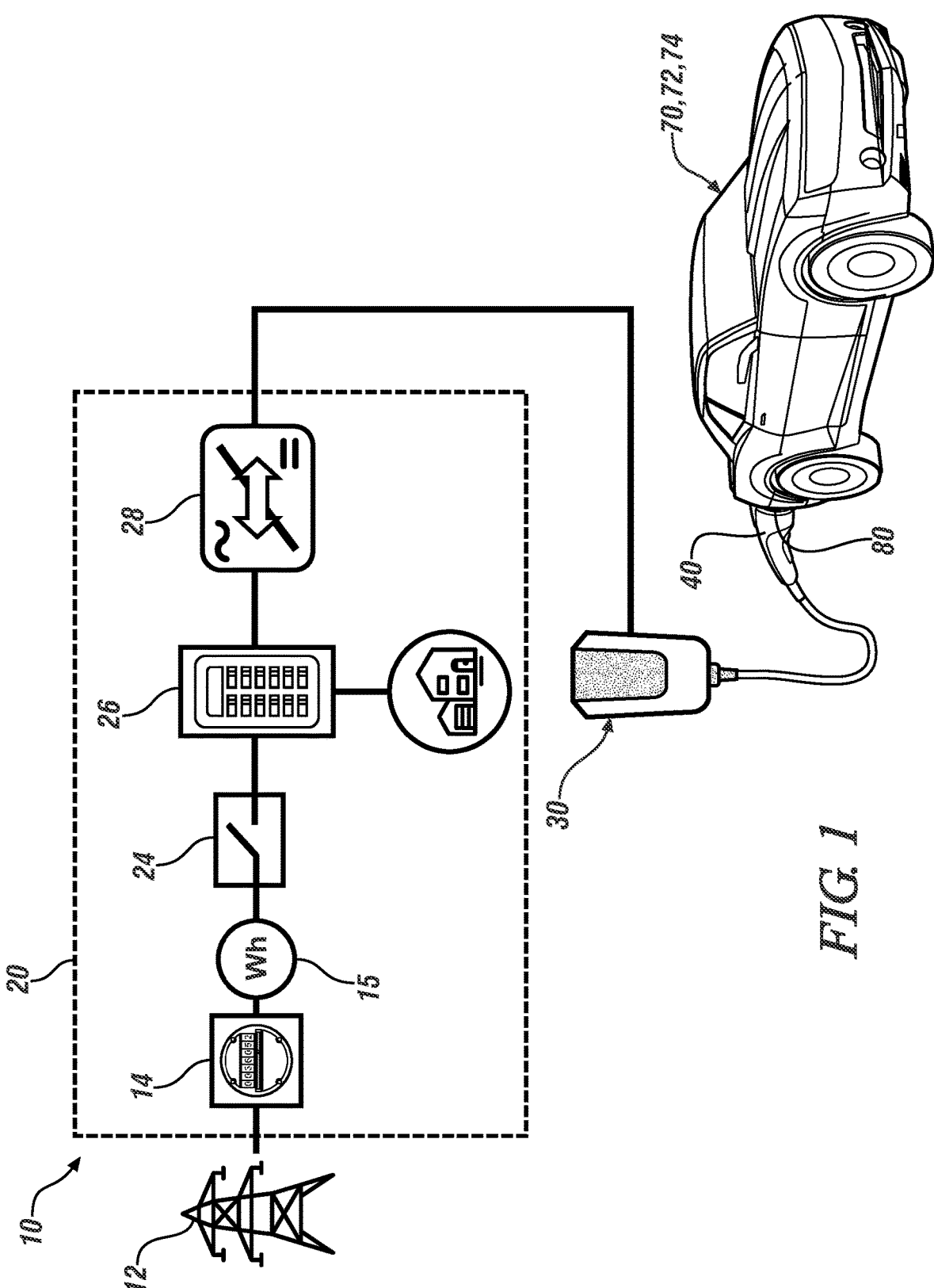
FIG. 1 pictorially illustrates an electrical power system for supplying electric power from a stationary power source to a rechargeable energy storage system (RESS) of an electrified vehicle during a period of time when the electrified vehicle is parked at or near a fixed structure, in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

The following detailed description is merely exemplary in nature and is not intended to limit the application and uses. Furthermore, there is no intention to be bound by expressed or implied theories presented herein. Throughout the drawings, corresponding reference numerals indicate like or corresponding parts and features.

Referring to the drawings, wherein like reference numbers refer to like features throughout the several views, FIG. 1 pictorially illustrates an electrical power system 10 for supplying electric power from a stationary power source 12 to a rechargeable energy storage system (RESS) 74 of an electrified vehicle 70 during a period of time when the electrified vehicle 70 is parked at or near a fixed structure 20. The electrified vehicle 70 may include, but is not limited to a mobile platform in the form of a commercial vehicle, industrial vehicle, agricultural vehicle, passenger vehicle, aircraft, watercraft, train, all-terrain vehicle, personal movement apparatus, robot, and the like to accomplish the purposes of this disclosure.

The stationary power source 12 may include, but is not limited to, public, quasi-public, or private electric power supply sources and distribution networks, including fuel-burning electric power plants, hydroelectric power plants, solar collectors, wind generators, etc., without limitation. The fixed structure 20 may include, but not be limited to a residential dwelling, a business unit, a storage center, a retail unit, an office building, etc., without limitation. The fixed structure 20 may also include a portable structure, such as a construction trailer or a recreational vehicle, which is temporarily fixed in place and is connected to the electrical power system 10.

The fixed structure 20 includes an electrical power distribution panel 26, a line disconnect switch 24, an electric power meter 14 including a watt-hour (Wh) meter 15, a bi-directional AC/DC electric power inverter 28, and an electrified vehicle charging system 30. The Wh meter 15 is arranged to monitor electric power flow to the electrified vehicle charging system 30.

The electrified vehicle charging system 30 includes a charging connector 40, wherein the charging connector 40 is couplable to a charge port 80 that is connected to the RESS 74 of the electrified vehicle 70. Charging terminals of the charge port 80 are configured to receive and engage with mating charging pins of the charging connector 40.

The electrified vehicle charging system 30 is bi-directional, i.e., is capable of transferring electric power originating from the stationary power source 12 to the electrified vehicle 70 via the electrical power distribution panel 26 under certain conditions, and is also capable of transferring electric power originating from the electrified vehicle 70 to the electrical power distribution panel 26 under other conditions.

The electrified vehicle 70 may be a battery electric vehicle (BEV), a hybrid electric vehicle (HEV), a plug-in hybrid vehicle (PHEV), or another vehicle power configuration, without limitation. The electrified vehicle 70 includes an electrified drivetrain 72 and a rechargeable energy storage system (RESS) 74, which is couplable to the stationary power source 12 via the charging connector 40 of the electrified vehicle charging system 30 and the charge port 80. The vehicle 70 may include, but is not limited to a mobile platform in the form of a commercial vehicle, industrial vehicle, agricultural vehicle, passenger vehicle, aircraft, watercraft, train, all-terrain vehicle, personal movement apparatus, robot, and the like to accomplish the purposes of this disclosure. The electrified drivetrain 72 may an electric drivetrain that employs only electrical devices to generate tractive power, such as electric motor/generators. Alternatively, the electrified drivetrain 72 may be a hybrid electric drivetrain that employs multiple devices to generate electric power and/or tractive torque, such as an internal combustion engine or a fuel cell, for example.

The RESS 74 is composed as one or a plurality of battery cell module assemblies. In one embodiment, the RESS 74 is a multi-cell high-voltage propulsion battery pack having a lithium-ion, nickel metal hydride, or another application-suitable electrochemical battery chemistry.

Figure 2:
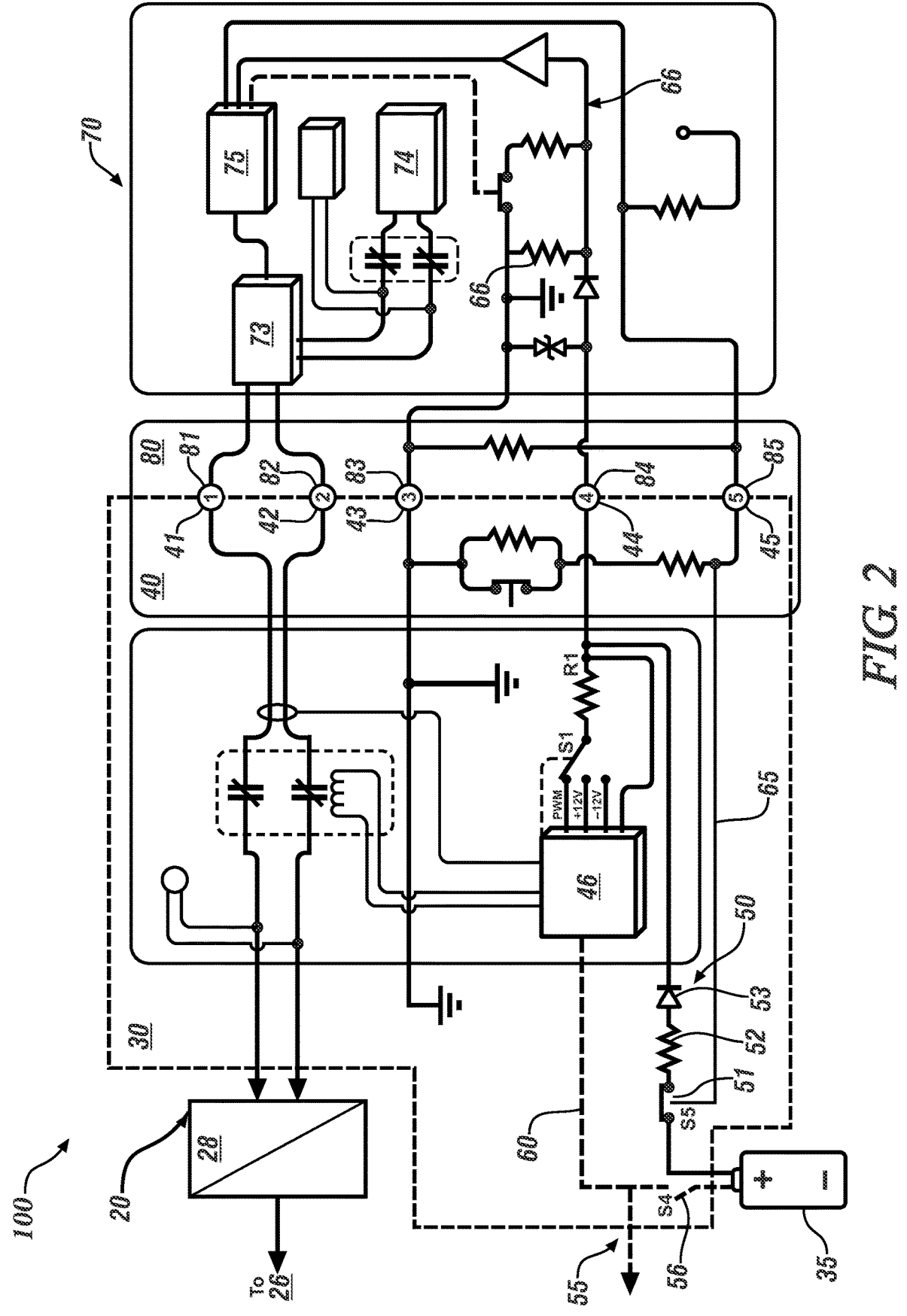
FIG. 2 schematically illustrates a system for supplying electric power originating from the RESS of the electrified vehicle to an embodiment of the electrical power distribution panel of the structure, in accordance with the disclosure.

Referring now to FIG. 2, with continued reference to the electrical power system 10 and other elements of FIG. 1, a system 100 for supplying electric power originating from the RESS 74 of the electrified vehicle 70 to an embodiment of the electrical power distribution panel 26 of the structure 20 is described.

One capability available to owners and/or operators of an embodiment of the electrified vehicle 70 is a Vehicle-to-Home (V2H) feature, wherein electric power from the RESS 74 of the electrified vehicle 70 may be used to supply electric power to an embodiment of the structure 20 in the event that there is an interruption of power supplied from the stationary power source 12.

The system 100 includes a stationary DC battery, also referred to as a Black Start Battery (BSB) 35 that is arranged to activate specific elements of the electrified vehicle charging system 30 as described herein to enable communication with the electrified vehicle 70. Under some circumstances, the electrified vehicle 70 is not connected to the electric power system 10 at a point in time when there is an interruption of power supplied from the stationary power source 12. The BSB 35 supplies electric power to facilitate the communication with the electrified vehicle 70 when it is plugged into the electrified vehicle charging system 30 subsequent to an interruption of power supplied from the stationary power source 12. The BSB 35 may also provide electric power for other functions, including providing energy to open the line disconnect switch 24, providing power to the bi-directional AC/DC electric power inverter (or bi-directional AC/DC inverter) 28 to pre-charge a high-voltage bus before activation to limit or avoid in-rush current.

The concepts described herein enable the elements of the electrified vehicle charging system 30 to be at an ultra-low power state to conserve energy in the BSB 35, including the capability to automatically activate the electrified vehicle charging system 30 upon plugging the charging connector 40 of the electrified vehicle charging system 30 into the connector 80 of the electrified vehicle 70 through a combination of providing a pilot voltage to the electrified vehicle 70 and sensing a proximity voltage in the electrified vehicle charging system 30. To conserve the energy in the BSB 35, the electrified vehicle charging system 30 can enter an Ultra-Low Power Mode, which consumes power from the BSB 35 in a milliwatt range after certain conditions are met, such as when the BSB 35 has reached a minimum threshold SOC (e.g., 80% SOC) or after a fixed time has elapsed since the outage began (e.g., 30 minutes).

In one embodiment, the charging connector 40 is a multi-pin device, e.g., a 5-pin or 5-terminal device that includes five terminals. The five terminals of the charging connector 40 include a positive (DC+) voltage terminal 41, a negative line (DC−) voltage terminal 42, a ground (G) voltage terminal 43, a control pilot (CP) voltage terminal 44, and a proximity (PROX) voltage terminal 45. The charging of an electric vehicle is performed in accordance with country-specific standards, with SAE J1772 being the relevant North American standard setting forth the required electrical hardware and communication protocols to be used when conducting a vehicle charging event. In one non-limiting embodiment, the charging connector may be embodied as a five-pin SAE J1772 charge connector in which five pins correspond to a Line 1 (L1) terminal, a Line 2/neutral (L2/N) voltage terminal, a ground (G) terminal, a 0-12V control pilot (CP) voltage terminal, and a 0-5V proximity (PROX) voltage terminal 45. Alternatively, the charging connector may be embodied as a seven-pin SAE J1772 charge connector in which five of the seven pins correspond to a Line 1 (DC+) terminal 41, a Line 2 (DC−) voltage terminal 42, a ground (G) terminal 43, a 0-12V control pilot (CP) voltage terminal 44, and a 0-5V proximity (PROX) voltage terminal 45. Alternatively, the charging connector 40 may have other connector arrangements with other pin arrangements within the scope of the concepts set forth in this disclosure. The SAE J1772 protocol is used herein for the purpose of illustrating one embodiment of the present teachings and associated voltage terminal/pin configurations within the non-limiting exemplary context of automotive charging, i.e., with the electrified host system being a motor vehicle. Other charging connector arrangements and pin configurations may be employed within the scope of the disclosure.

The charge port 80 mates with the charging connector 40, and is a 5-pin or 5-terminal device, with five terminals. The five terminals of the charge port 80 include a positive (DC+) voltage terminal 81, a second line (DC−) voltage terminal 82, a ground (G) voltage terminal 83, a control pilot (CP) voltage terminal 84, and a proximity (PROX) voltage terminal 85.

The bi-directional AC/DC inverter 28 is connected to the RESS 74 when the charge port 80 is connected to the charging connector 40 via the positive (DC+) voltage terminal 41 and the negative (DC−) voltage terminal 42. The bi-directional AC/DC inverter 28 is configured to convert DC electric power originating from the RESS 74 to an AC voltage for use in the stationary panel 26, and vice versa as needed.

The electrified vehicle charging system 30 includes a connector controller (Control Electronics) 46.

The electrified vehicle charging system 30 and the charging connector 40 further include a first circuit 50 that includes a first controllable switch 51 that may be arranged in series with a diode 53 and a resistive element 52 between the BSB 35 and the pilot voltage terminal 44.

The electrified vehicle charging system 30 and the charging connector 40 further include a second circuit 55 including a second controllable switch 56 that is controllable to electrically connect the BSB 35 to a power link 60 between the connector controller 46 and the bi-directional AC/DC inverter 28. When the second controllable switch 56 is controlled to electrically connect the BSB 35 to the power link 60, the BSB 35 supplies electric power to power the connector controller 46. Adding the second switch 56 in series with the BSB 35 enables operation in the Ultra-Low Power Mode, which limits draining power from the BSB 35. When the second switch 56 is open, little to no power is drawn from the BSB 35. Only essential circuits needed to close the first switch 51 are kept alive on a separate circuit feed/supply.

When the charging connector 40 is disconnected from the charge port 80 of the electrified vehicle 70, the first switch 51 is controllable to a closed state (i.e., activated to transfer power) and the second switch 56 is controlled to an open state (i.e., deactivated). Alternatively, the first switch 51 may be repetitively cyclically controlled to one of the closed state and the open state when the charging connector is disconnected from the charge port 80 of the electrified vehicle to save energy. In one embodiment, the repetitive cyclically controlled duty cycle could be determined in relation to a duration of a power outage or based upon a state of charge (SOC) of the BSB 35, e.g., 100% initially, followed by a 50% after a certain SOC of the BSB 35 is achieved, e.g., 5 seconds on, 5 seconds off. This may be followed by a 10% duty cycle after a critical SOC of the BSB 35 is achieved, e.g., 5 seconds on, 45 seconds off. The timing and duty cycles are calibrated, and the examples described herein are merely illustrative. The representative cyclical control is executed to reduce the power draw on the BSB 35, and thus may extend a standby waiting time prior to connecting the electrified vehicle 70.

When the charging connector 40 is connected to the charge port 80 of the electrified vehicle 70, the first switch 51 is controllable to an open state (i.e., deactivated) and the second switch 56 is controlled to a closed state (i.e., activated), as detected by the charging system 30 via link 65. Link 65 detects the presence (or absence) of a voltage potential on the proximity voltage terminal 45. Adding the second switch 56 in series with the BSB 35 enables operation in an ultra-low power mode, which limits draining power from the BSB 35. When the second switch 56 is open, little to no power is drawn from the BSB 35. Essential circuits that are needed to close the first switch 51 may be kept alive on a separate circuit feed/supply.

This arrangement facilitates operation of the BSB 35 in the Ultra-Low Power Mode when the charging connector 40 is disconnected from the charge port 80 of the electrified vehicle 70. This arrangement facilitates automatic activation of the electrified vehicle charging system 30 upon plugging the charging connector 40 of the electrified vehicle charging system 30 into the charge port 80 of the electrified vehicle 70 through a combination of providing a pilot voltage to the electrified vehicle 70 and sensing a proximity voltage in the electrified vehicle charging system 30.

The electrified vehicle 70 includes a charge controller 75 that controls a charging device 73 to control electric power flow to the RES S 74 for purposes of charging and discharging via the charge port 80. The charge controller 75 includes a proximity detection circuit 66 that measures the voltage between the proximity (PROX) voltage terminal 85 and the ground (G) voltage terminal 83 on the charge port 80. When the charge controller 75 measures a voltage level greater than zero (e.g., approximately 1.5 V) between Pin 5 85 and Pin 3 83 of the charge port 80, it confirms that the charging connector 40 is plugged into the charge port 80. The EV must supply a regulated voltage (e.g., +5 V) for the Proximity Detection Circuit to detect a voltage, but it is not be assumed that the regulated voltage (e.g., +5 V) will always be available on the electrified vehicle 70. For example, the charge controller 75 may only provide the regulated voltage (+5 V) when it is awake.

The charge controller 75 can wake up upon detecting a pilot voltage on the pilot circuit (pin 4) 84 (e.g., approximately 12 V) from the electrified vehicle charging system 30.

The electric vehicle charging system 30 contains a first circuit 50 that can provide voltage (e.g., +12 V) directly to the pilot circuit (i.e., Pin 4) from the BSB 35. This must draw minimal power from the BSB 35 while it is in an ultra-low power mode. This can be achieved when the electric vehicle charging system 30 connector is unplugged and there is an open circuit on the Pilot pin 84.

When the charging connector 40 is plugged into the charge port 80 of the electrified vehicle 70, the charge controller 75 of the electrified vehicle 70 will wake up when it detects a voltage potential (e.g., 12 V) on the Pilot pin 84 and will supply the Proximity Voltage.

When the electric vehicle charging system 30 detects a voltage potential (e.g., ~1.5 V) on the proximity (PROX) voltage terminal 85, the BSB 35 is switched to provide electrical power to the elements in the electrified vehicle charging system 30. The electric vehicle charging system 30 now may provide the appropriate Pilot voltage through connector controller 46. The electrified vehicle charging system 30 can disconnect the voltage (+12 V) direct connection from the BSB 35 to the Pilot pin 4 44 to avoid interfering with PWM signal.

Charging terminals of the charge port 80 are configured to receive and engage with mating charging pins of the charging connector of the electric vehicle charging system 30 charging station.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component may store machine readable instructions in the form of one or more software or firmware programs or routines, combinational logic circuit(s), input/output circuit(s) and devices, signal conditioning, buffer circuitry and other components, which may be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The term "parameter" refers to a measurable quantity that represents a physical property of a device or other element that is discernible using one or more sensors and/or a physical model. A parameter can have a discrete value, e.g., either "1" or "0", or can be infinitely variable in value.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

The invention claimed is:

1. An electrified vehicle charging system, comprising:
   a charging connector including a multi-pin connector having a pilot voltage terminal, and a proximity voltage terminal;
   a connector controller;
   a first circuit including a first controllable switch, wherein the first circuit is electrically connected between a stationary battery and the pilot voltage terminal; and
   a second circuit including a second controllable switch that is controllable to electrically connect the stationary battery to a power link between the connector controller and a stationary inverter;
   wherein the first switch is controllable to a closed state and the second switch is controlled to an open state when the charging connector is disconnected from a charge port of an electrified vehicle; and
   wherein the first switch is controlled to an open state and the second switch is controlled to a closed state when the charging connector is connected to the charge port of the electrified vehicle.

2. The electrified vehicle charging system of claim 1, further comprising the first circuit including the first controllable switch arranged in series with a diode and a resistive element between the stationary battery and the pilot voltage terminal.

3. The electrified vehicle charging system of claim 1, further comprising the charging connector having a positive DC power terminal, a negative DC power terminal, and a ground terminal.

4. The electrified vehicle charging system of claim 3,
   wherein the stationary inverter comprises a bi-directional AC/DC power inverter; and
   wherein the positive DC power terminal and the negative DC power terminal of the charging connector are connected to the bi-directional AC/DC power inverter via electrical cables.

5. The electrified vehicle charging system of claim 1, wherein the stationary battery comprises a low voltage DC battery that powers the connector controller when the second switch is controlled to the closed state.

6. The electrified vehicle charging system of claim 1, comprising the first switch being repetitively cyclically controlled to the closed state and an open state when the charging connector is disconnected from the charge port of the electrified vehicle.

7. The electrified vehicle charging system of claim 1, wherein the charging connector is mated to and connectable to the charge port of the electrified vehicle.

8. A system for supplying electric power to an electrical power distribution panel, the system comprising:
   an electrified vehicle charging station including a charging connector;
   a bi-directional AC/DC power inverter; and
   a stationary battery;

wherein the charging connector is couplable, via a charge port, to a rechargeable energy storage system of an electrified vehicle;

wherein the charging connector includes:

a pilot voltage terminal, a proximity voltage terminal, and a connector controller;

a first circuit including a first controllable switch, wherein the first circuit is electrically connected between the stationary battery and the pilot voltage terminal;

a second circuit including a second controllable switch that is controllable to electrically connect the stationary battery to a power link between the connector controller and the bi-directional AC/DC power inverter;

wherein the first switch is controllable to a closed state and the second switch is controlled to an open state when the charging connector is disconnected from a charge port of the electrified vehicle;

wherein the first switch is controlled to an open state and the second switch is controlled to a closed state when the charging connector is connected to the charge port of the electrified vehicle; and wherein the electrified vehicle supplies electric power to the electrical power distribution panel upon the charging connector being connected to the charge port of the electrified vehicle.

9. The system of claim 8, wherein the charging connector is electrically connected to the electrical power distribution panel via the bi-directional AC/DC power inverter.

10. The system of claim 8, wherein the electrical power distribution panel is disposed at a fixed structure.

11. The system of claim 8, comprising:

the electrical power distribution panel being electrically connectable to an electric power system; and the electrical power distribution panel being arranged to transfer electric power from the electric power system to the electrified vehicle charging station via the bi-directional AC/DC power inverter;

wherein, when a power interruption occurs between the electric power system and the electrical power distribution panel and the charging connector is disconnected from the charge port of the electrified vehicle, the first switch is controllable to the closed state and the second switch is controlled to the open state.

12. The system of claim 11, comprising the first switch being repetitively cyclically controlled to one of the closed state and an open state when the charging connector is disconnected from the charge port of the electrified vehicle.

13. The system of claim 11, further comprising:

wherein, when the power interruption occurs between the electric power system and the electrical power distribution panel, and the charging connector is connected to the charge port of the electrified vehicle subsequent to initiation of the power interruption, the first switch is controlled to the open state and the second switch is controlled to the closed state; and wherein the electrified vehicle supplies electric power to the electrical power distribution panel upon the charging connector being connected to the charge port of the electrified vehicle.

14. The system of claim 8, further comprising the first circuit including the first controllable switch arranged in series with a diode and a resistive element between the stationary battery and the pilot voltage terminal.

15. The system of claim 8, further comprising the charging connector having a positive DC voltage terminal, a negative voltage terminal, and a ground terminal.

16. The system of claim 15, wherein the positive DC voltage terminal and the negative DC voltage terminal of the charging connector are connected to the bi-directional AC/DC power inverter via electrical cables.

17. The system of claim 8, wherein the stationary battery comprises a low voltage DC battery that powers the connector controller when the second switch is controlled to the closed state.

18. The system of claim 8, wherein the charging connector is mated to and connectable to the charge port of the electrified vehicle.

19. A method for supplying electric power to an electrical power distribution panel subsequent to a power interruption from an electric power source that is arranged to supply electric power thereto, the method comprising:

connecting a charging connector of an electrified vehicle charging station to a charge port electrically connected to a rechargeable energy storage system (RESS) of an electrified vehicle, wherein the charging connector is electrically connected to a bi-directional AC/DC power inverter electrically connected to the electrical power distribution panel;

connecting, via the charging connector, a pilot terminal of the charging connector to a stationary DC battery;

detecting, in the pilot terminal of the charging connector, a non-zero voltage;

activating a charge controller of the rechargeable energy storage system;

sending via the charge controller, a proximity signal to the charging connector;

detecting, via a connector controller of the charging connector, the proximity signal;

connecting, via a controllable switch, the stationary DC battery to the connector controller;

commanding, via the connector controller of the charging connector, a pilot signal to the charge controller; and controlling, via one of the charge controller and the connector controller of the charging connector, electric power flow from the RESS to the electrical power distribution panel.

20. The method of claim 19, wherein the electrical power distribution panel is disposed at a fixed structure.

* * * * *